United States Patent [19]

Vargas, Jr.

[11] 3,934,141

[45] Jan. 20, 1976

[54] APPARATUS FOR AUTOMATICALLY REGULATING THE AMOUNT OF CHARGE APPLIED TO AN INSULATING SURFACE

[75] Inventor: Rudolph Vargas, Jr., Alhambra, Calif.

[73] Assignee: Xerox Corporation, Stamford, Conn.

[22] Filed: July 3, 1974

[21] Appl. No.: 485,412

[52] U.S. Cl. ................ 250/325; 250/324; 250/326; 317/262 A

[51] Int. Cl.² .......................................... G03B 15/02

[58] Field of Search .................... 250/324, 325, 326; 317/262 A

[56] References Cited

UNITED STATES PATENTS

| | | | |
|---|---|---|---|
| 3,489,895 | 1/1970 | Hollberg | 250/324 |
| 3,586,908 | 6/1971 | Vosteen | 317/262 A |
| 3,604,925 | 9/1971 | Snelling et al. | 250/326 |
| 3,699,335 | 10/1972 | Giaimo | 250/326 |
| 3,775,669 | 11/1973 | Baker | 250/324 |
| 3,819,942 | 6/1974 | Hastwell | 250/324 |

*Primary Examiner*—James W. Lawrence
*Assistant Examiner*—B. C. Anderson
*Attorney, Agent, or Firm*—James J. Ralabate; Terry J. Anderson; Irving Keschner

[57] ABSTRACT

Apparatus for automatically regulating the amount of charge applied to an insulating surface. In a first embodiment an electrometer measures the electrostatic potential, or charge, on the insulating surface and generates an output voltage proportional thereto. The output voltage is continuously monitored and compared in a comparison means with a reference potential, the difference therebetween corresponding to an error signal. The error signal is periodically sampled and applied to an analog incremental integrator, the output thereof being coupled to a corona generator power supply, the power supply in turn being coupled to a corona electrode. The voltage applied by the power supply to the corona electrode is of a magnitude to cause the wire to apply sufficient charge to the insulating surface to reduce the error signal to substantially zero. In a second embodiment the output of the comparison means is sampled and delayed and then coupled to the corona generator power supply. A digital incremental integrator, which may be utilized in lieu of the analog incremental integrator, is also disclosed.

12 Claims, 5 Drawing Figures

APPARATUS FOR AUTOMATICALLY REGULATING THE AMOUNT OF CHARGE APPLIED TO AN INSULATING SURFACE

BACKGROUND OF THE INVENTION

In the art of electrophotography, including xerography, an electrophotographic material comprising a photoreceptor overlying a conductive substrate is electrically charged generally by means of a corona discharge, the charged material is exposed to light from an image and subsequently electrically charged particles are deposited selectively thereon so as to produce a visible image. When the electrophotographic material is subjected to an electric charging, the amount of charge deposited on the material varies with the conditions associated with the corona discharge, such as relative humidity, contamination of the charging wire or electrode, spacing between the surface of the photoreceptor and the corona generator, the voltage applied to the corona generator, ambient pressure and temperature. Since the above enumerated factors can vary with time, a variable photoreceptor charge may result with the attendant variation in the copy produced. Further, the thickness, dielectric constant and dielectric leakage of the photoreceptor can vary from receptor to receptor and as a function of time, also producing a variable photoreceptor charge.

A prior art technique for compensating for the variation of charge applied to the surface of a photoreceptor is disclosed in U.S. Pat. No. 3,586,908. The apparatus disclosed therein regulates the photoreceptor potential by comparing the output of an electrometer to a preset fixed potential value and generating a signal representing the difference therebetween the integrating the difference signal. The integrated difference signal causes a high voltage supply to supply a corresponding input voltage to a corona generator whereby the latter charges the photoreceptor surface to the preset fixed potential value. A switch may be interposed at the input terminal of the integrator to restrict the input to those times when a valid sample is disclosed, providing discontinuous sampling that may be required when plates or sheets, as opposed to drums, are being utilized as the photoreceptor support.

In the opposite sense, the "discontinuous sampling" technique disclosed, however, is not adapted for use when the photoreceptor is supported on a drum or the electrophotographic material comprises a continuous photosensitive web.

The use of a continuous control system as disclosed in the aforementioned patent does not allow the measurement of photoreceptor potentials at any point in the cycle due to delay time problems associated therewith. Further, the output of the corona generator is not periodically corrected for the duration of the cycle. The potential level per cycle therefore may be variable.

As exemplified in the aforementioned patent, the integrator utilized to integrate the difference, or error, signal is generally of the analog type, i.e., an operational amplifier having a feedback capacitor coupling the output to one of the amplifier inputs. Although analog integrators perform satisfactorily, long intervals between sampling increments may affect the charge retention capabilities of the integrating capacitor.

SUMMARY OF THE PRESENT INVENTION

The present invention provides apparatus for regulating the charge applied to the surface of an insulator, such as a photoreceptor, whereby the quality of the reproduced images may be maintained for a substantial period of time. In particular, an electrometer measures the electrostatic potential, or charge, on the insulating surface and generates an output voltage proportional thereto. The output voltage is continuously monitored and compared in a comparison means with a reference potential, the difference therebetween corresponding to an error signal. The error signal is periodically sampled and transferred to an analog incremental integrator by gating a field effect transistor (FET) with a monostable multivibrator triggered at a desired point in the machine cycle. The output of the integrator is applied to a corona generator power supply which supplies an input voltage to the corona generator to cause the latter to charge the insulator surface to a value proportional to the reference potential, thereby reducing the error signal to substantially zero. In a second embodiment, the output of the comparison means is sampled, as set forth hereinabove, and then is delayed in time by interposing a second FET and a storage capacitor between the integrator output and the corona generator power supply, allowing the photoreceptor voltage to be sampled at one point in the machine cycle and the corona generator potential to be corrected at a different point in the cycle. A digital incremental integrator is provided which may be utilized in lieu of the analog incremental integrator.

It is an object of the present invention to provide apparatus for regulating the electrostatic potential on an insulating surface.

It is a further object of the present invention to provide apparatus for regulating the electrostatic potential on a photoreceptor by measuring the potential on the surface of the photoreceptor, comparing the measured value with a reference value and generating a signal representing the difference therebetween, sampling the difference signal at predetermined points in the machine cycle, the sampled output being applied to an integrator, the integrator output in turn controlling a high voltage supply which supplies a corresponding input voltage to a corona generator whereby the photoreceptor surface is charged to a value proportional to the reference potential.

It is still a further object of the present invention to provide apparatus for regulating the electrostatic potential applied on the surface of a photoreceptor by measuring the potential on the surface of the photoreceptor, comparing the measured potential with a reference value and generating a signal representing the difference therebetween, sampling the difference signal at predetermined points in the machine cycle, delaying the sampled signal for a predetermined period, the delayed sampled signal being applied to an integrator, the integrator output in turn controlling a high voltage supply which supplies a corresponding input voltage to a corona generator whereby the photoreceptor surface is charged to a value proportional to the reference potential.

It is a further object of the present invention to provide a digital incremental integrator which may be utilized in the electrostatic potential regulating apparatus described hereinabove.

DESCRIPTION OF THE DRAWINGS

For a better understanding of the invention as well as other objects and further features thereof, reference is made to the following description which is to be read in conjunction with the following drawings wherein.

DESCRIPTION OF THE PREFERRED EMBODIMENT

Figure 1:
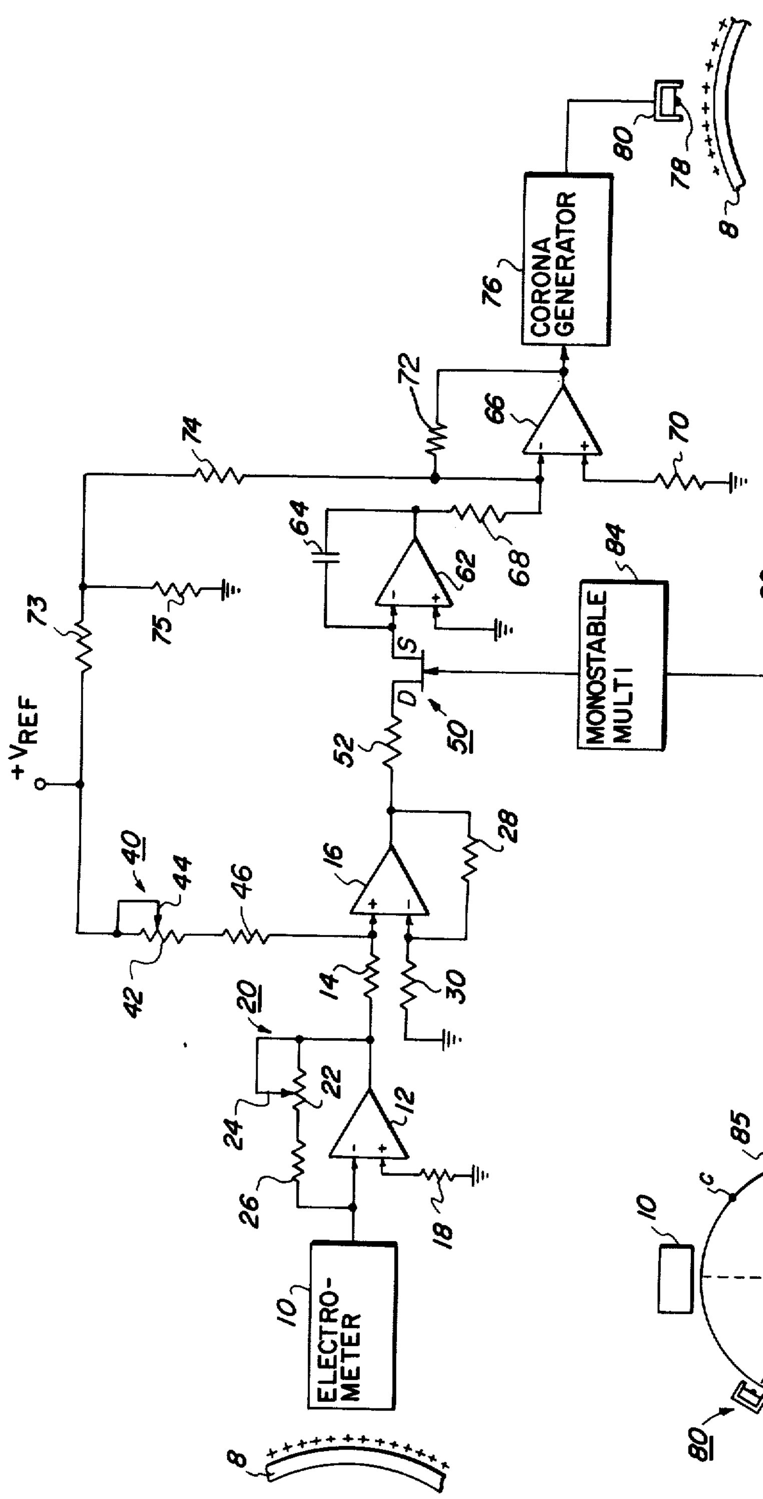
FIG. 1 is a schematic diagram of a sampled control circuit in accordance with the teachings of the present invention.

Referring now to FIG. 1, a schematic diagram of the charge regulating circuit wherein the electrostatic potential on a photoreceptor surface is periodically sampled is illustrated. In particular, the electrometer 10 is positioned adjacent insulating surface 8, such as a photoreceptor, and generates an output voltage which represents the magnitude and polarity of the actual electrostatic potential on the insulating surface 8. The output of electrometer 10 is coupled to the inverting input of operational amplifier 12, the output thereof being coupled to one input terminal of operational amplifier 16. The other input of amplifier 12 is coupled to ground via resistor 18. The output of amplifier 12 is also coupled to its non-inverting input via potentiometer 20, comprising resistor 22 and adjustable tap 24, and resistor 26. The output of amplifier 16 is coupled to the inverting input thereof via resistor 28 and to ground via resistor 30. A reference voltage +V*ref* is coupled to the non-inverting input of amplifier 16 via potentiometer 40, comprising resistor 42 and adjustable tap 44, and resistor 46. The output of amplifier 16 is coupled to the drain electrode of field effect transistor (FET) 50 via resistor 52. The source electrode of FET 50 is connected to the inverting input of operational amplifier 62 having an integrating feedback capacitor 64 coupled between the output and inverting input thereof. The non-inverting input of amplifier 62 is connected to ground. Operational amplifier 62 functions as an analog integrator in the configuration shown. The output of integrator 62 is coupled to one input of operational amplifier 66 via resistor 68, the non-inverting input of operational amplifier 66 being coupled to ground via resistor 70. The output of operational amplifier 66 is coupled to the inverting input thereof via resistor 72, operational amplifier 66 functioning as a summing amplifier. The inverting input of operational amplifier 66 is coupled to V*ref* via resistor 74. The output of operational amplifier 66 is coupled to corona generator power supply 76, the output thereof being connected to the corona electrode 78 of corona generator 80.

In operation, electrometer 10 produces a voltage signal which is proportional to the electrostatic potential on the surface of insulator 8. Electrometers are commercially available and, for example, may comprise the system disclosed in U.S. Pat. No. 3,667,036. The output of electrometer 10 is applied to amplifier 12 which amplifies the electrometer output and provides an impedance buffer between the electrometer output and the input of operational amplifier 16. If the output of the electrometer is current, adjustable tap 24 is positioned such that the output current is transformed into a voltage within the output limits of amplifier 16. The output of the buffer amplifier 12 is coupled to the non-inverting input of amplifier 16. The reference voltage V*ref*, adjusted by potentiometer 40 and resistor 46 to provide a value proportional to a desired predetermined fixed electrostatic potential on the insulator surface, is also coupled to the non-inverting input of amplifier 16. Since amplifier 12 inverts the electrometer signal applied thereto, a positive electrostatic potential, for example, on the surface of the insulator will be reflected as a negative potential at the input of amplifier 16. Therefore, the positive modified reference potential is differentially compared with the measured electrostatic potential at the input of amplifier 16. If the measured potential is equal to the predetermined potential value, no output is generated by amplifier 16. If the measured value is less than the predetermined potential value, a positive potential will appear at the output of amplifier 16. If the measured value is greater than the predetermined potential, a negative potential will appear at the output of amplifier 16.

FET 50 is essentially a signal transferring device and comprises an output circuit between its source and drain electrodes and a gate electrode into which a control signal is applied. When a negative signal is applied to the gate electrode, the output circuit of the field effect transistor 50 is conductive; and when it is absent, i.e., positive, its output circuit is non-conductive. In the circuit shown in FIG. 1, when a trigger signal is applied to terminal 82, monostable multivibrator 84 is gated and a negative pulse of a predetermined period, 100 milliseconds, for example, is generated. The FET output circuit is therefore conductive during the pulse period and the output of amplifier 16 corresponding to the difference between the measured potential and the predetermined potential (hereinafter referred to as the error signal) is applied to operational amplifier, or integrating amplifier, 62. The integrated error signal is thereafter applied to the input of amplifier 66. It should be noted at this point that the reference potential applied to the inverting terminal of amplifier 66 is related to the reference potential applied to the input terminal of amplifier 16 in that, in the absence of an error signal, its magnitude is sufficient to control corona generator power supply 76 such that corona electrode 78 applies a nominal or desired electrostatic charge to the insulator surface 8 (the corona electrode 78 is actually positioned adjacent electrometer 10). Therefore, if the measured potential on the insulator surface is greater than the desired potential, the error signal at the input to amplifier 66 will be negative in polarity and, when summed with the reference potential thereat, will reduce the voltage applied to power supply 76, which in return will reduce the voltage applied to corona electrode 78. If the measured potential is less than the desired potential, the error signal at the input to amplifier 66 will be positive in polarity and, when summed with the reference potential thereat, will increase the voltage applied to power supply 76, which in turn will increase the voltage applied to corona electrode 78.

In accordance with the teaching of the present invention, the error signal is sampled once each machine cycle for a preset period of time in order to incrementally correct the output of integrator 62. This output, therefore, will be constant until the next sampling period and is conditioned by amplifier 66 to levels suited for controlling the corona generator power supply 76. Therefore, the bipolar output of operational amplifier 16, which continuously represents the error between the potential measured on insulating surface 8 and the predetermined, or desired, value is transferred to the integrator 62 once each cycle. The transfer takes place by gating FET 50 with the output of monostable multivibrator 84 which is triggered by a microswitch positioned at a desired point in each machine cycle where it is desired to correct the output of corona generator 76 in order to minimize the error signal for the succeeding cycle.

The logic of the machine which incorporates the charge regulating circuit described hereinabove may be easily arranged to generate the trigger signal applied to terminal 82 at the desired point in the machine cycle. For example, the machine logic system described in U.S. Pat. No. 3,667,036 is arranged to generate a triggering signal as the scanning lens passes the midpoint of its programmed path of travel. The trigger signal, generated, for example, by a microswitch, is applied to terminal 82 as described hereinabove which triggers the operation of the monostable multivibrator 84, the output thereof comprising a negative output pulse of predetermined period. The multivibrator output is coupled to the gate electrode of FET 50. Therefore, the error signal at the output of amplifier 16 is coupled to integrator 62 for a time period dependent upon the monostable multivibrator period which can be variable.

The advantage of a sampled regulating or control system over a continuous control system is that a measurement of the electrostatic potential on an insulating surface can be obtained at any point in the cycle without delay time difficulties. This provides a periodically corrected constant corona generator output for the duration of the cycle thereby assuring a fixed potential level per cycle.

Figure 1A:
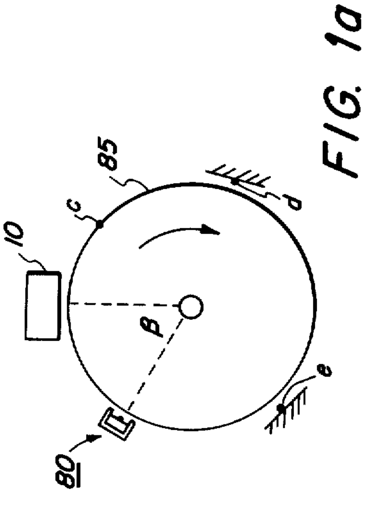
FIG. 1*a* illustrates how the control circuit of FIG. 1 is utilized with the insulator supported on a drum.

FIG. 1*a* illustrates the operation of the present invention as applied to a xerographic drum potential control system. The electrometer 10 is positioned adjacent xerographic drum 85 which rotates in the direction indicated. The electrometer 10 is positioned in the forward direction relative to corona generator 80 with respect to the direction of rotation of drum 85. The corona generator 80 is angularly displaced from electrometer 10 by angle $\beta$. In accordance with the teachings of the present invention, the triggering signal applied to terminal 82 may be arranged to occur, for example, each time point C on the surface of drum 85 passes fixed point d external to drum 85.

Figure 2:
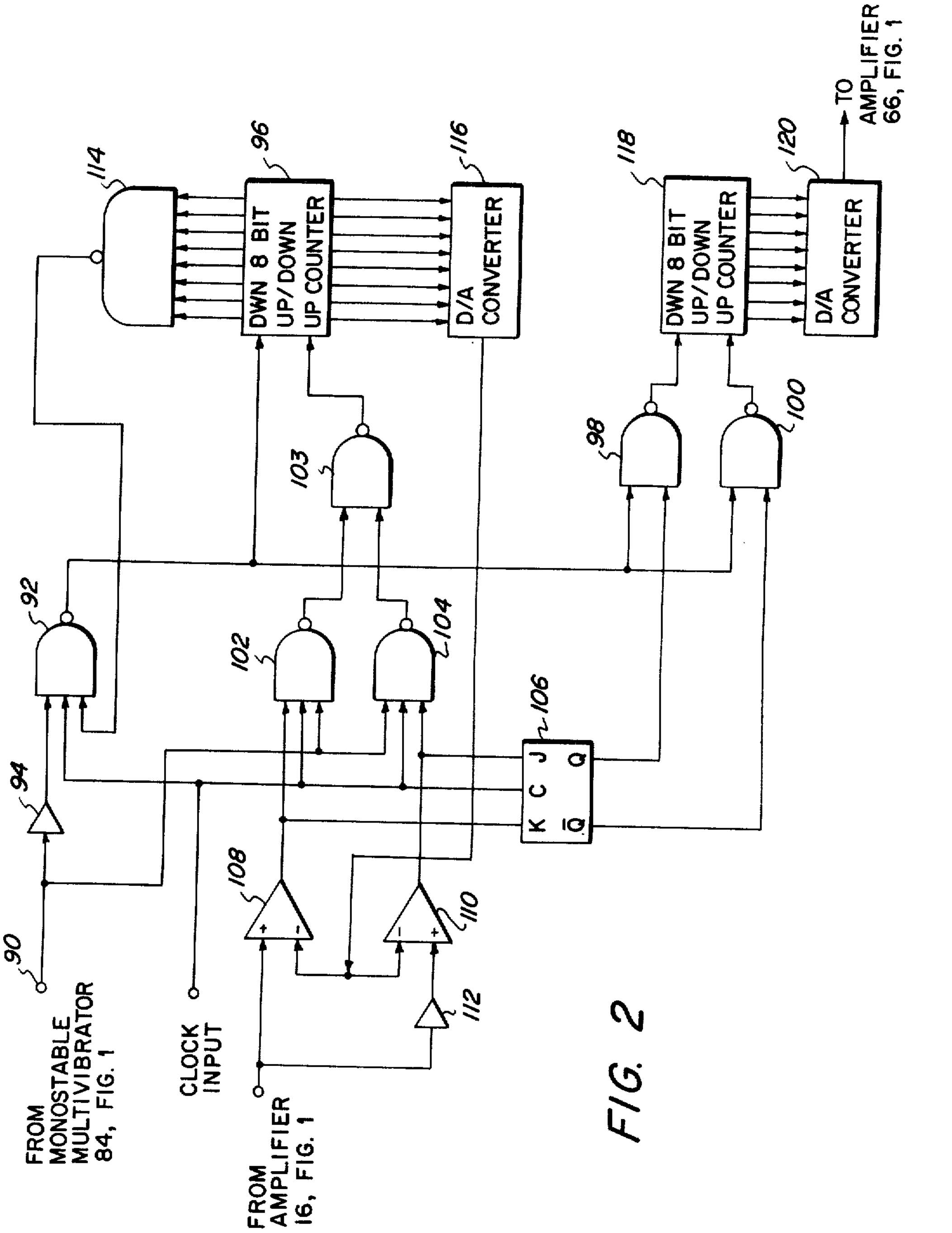
FIG. 2 is a schematic diagram of a digital incremental integrator which may be utilized in the circuit described with reference to FIG. 1.

Referring now to FIG. 2, a block diagram of a digital incremental integrator which may be utilized in lieu of the analog integrator 62 shown in FIG. 1 is shown. The advantage of a digital incremental integrator is its information retention capability without deterioration. This is a desirable property if long intervals between sampling increments, as in relatively long cycle machines, is a requirement. Further, if the integrating capacitor 64 shown in FIG. 1 is accidentally grounded, the information signal would be lost.

The negative pulse generated by monostable multivibrator 84 (FIG. 1) is applied to terminal 90 and to one of the inverter inputs of NAND gate 92 via inverter 94. The output of NAND gate 92 is applied to the down input of a reversible 8-bit, up-down counter 96, to one of the inverter inputs of NAND gate 98 and NAND gate 100. The output of monostable multivibrator 84 (FIG. 1) is applied to an inverter input of NAND gate 102 and NAND gate 104. The clock input, generated by a high frequency oscillator (not shown) is necessary in the digital mode of operation, and is applied to another input of NAND gate 92, a second input of NAND gate 102, a second input of NAND gate 104, and to the clock input of JK flip-flop 106. The output from the amplifier 16 is applied to one input of analog comparators 108 and 110, the latter via inverter 112. The output of comparator 108 is applied to the K input of JK flip-flop 106 and to the third input of NAND gate 102. The output of analog comparator 110 is applied to the J input of JK flip-flop 106 and to the other input of NAND gate 104. The outputs of NAND gates 102 and 104 are each coupled to an input of NAND gate 103, the output thereof being coupled to the up terminal of up-down counter 96. The output of the up-down counter 96 is applied to the input of NAND gate 114, the output of which is coupled to the other input of NAND gate 92. The output of up-down counter 96 is also applied to the input of digital analog converter 116, the output thereof being coupled to the other input of analog comparators 108 and 110. The Q output of JK flip-flop 106 is coupled to the other input of NAND gate 98 and the $\overline{Q}$ output is coupled to the other input of NAND gate 100. The output of NAND gate 98 is coupled to the down input of 8-bit up-down counter 118, and the output of NAND gate 100 is coupled to the up input of up-down counter 118. The output of the up-down counter 118 is coupled to the input of digital-analog converter 120. The output of digital-analog converter 120 is coupled to the input of amplifier 66 (FIG. 1).

In operation, the error signal generated at the output of differential amplifier 16 is applied to the positive input of comparator 108 and to inverter 112. The output of inverter 112 drives the positive input of comparator 110. A positive error signal will unbalance comparator 108 which in turn will enable one input of a three input NAND gate 102 and the set, or K, input of flip-flop 106 which enables one input of two input NAND gate 98.

The incremental update signal from monostable multivibrator 84 enables a second input of NAND gate 102 which allows a higher frequency clock rate signal to count up counter 96 via NAND gate 103. The digitized output of the up-down counter is transferred to a D/A converter 116, where it is converted to an analog equivalent and fed back to the negative inputs of comparators 108 and 110.

The state of the up-down counter 96 is increased until its analog equivalent at the negative terminals of the comparators is equal to the value of the error signal. At this point, the output of the comparator 108 will change state, inhibiting NAND gate 102.

Any count registered in up-down counter 96 will produce an output from NAND gate 114 which in turn enables one input of NAND gate 92. A second input of NAND gate 92 is enabled by inverter 94 upon termination of the incremental update signal. This enables the clock pulse to count down counter 96 and through NAND gate 98, also count down counter 118. The clock pulses will continue to decrease the state of counter 118 until the state in counter 96 is reduced to zero. When this occurs, NAND gate 114 will inhibit one input of NAND gate 92 and the state of counter 118 will have been reduced by the value that was initially registered in counter 96.

The analog equivalent to the reduced state of counter 118 will result at the output of D/A converter 120 and is applied to amplifier 66 shown in FIG. 1.

A negative error signal will unbalance comparator 110 which in turn will enable one input of NAND gate 104 and reset flip-flop 106, enabling one input of NAND gate 100.

The operation of the incremental integrator for the negative error signal is similar to that described hereinabove with reference to the detected positive error signal, the result being an increase in the state of counter 118.

Figure 3:
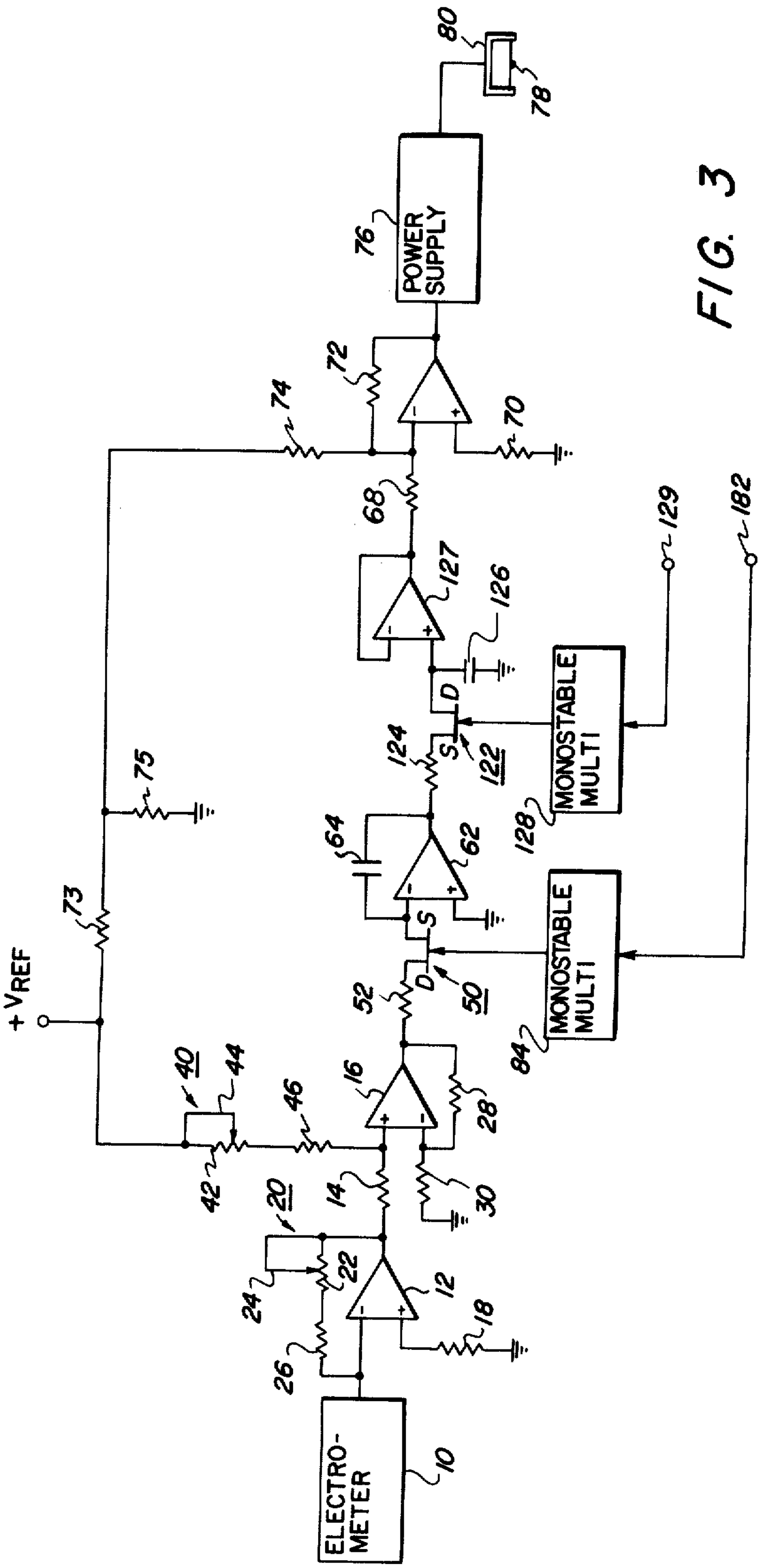
FIG. 3 is a schematic diagram of a delayed sampled control circuit utilized in accordance with the teachings of the present invention.

Referring now to FIG. 3, a schematic diagram of a delayed sampled control circuit in accordance with the teachings of the present invention is shown. Elements in FIG. 3 and FIG. 1 having the same reference numerals are identical.

In essence, FIG. 3 modifies the embodiment shown in FIG. 1 by interposing an additional switching, or transfer, element and storage capacitor between the output of integrator 62 and amplifier 66. In particular, the source electrode of FET 122 is coupled to the output of amplifier 62 via resistor 124. The drain electrode of FET 122 is connected to one terminal of a sample-and-hold capacitor 126, the other terminal of which is grounded, and to the noninverting input of unity gain buffer amplifier 127, the output thereof being coupled to the inverting input of amplifier 66 via resistor 68. The output of monostable multivibrator 128 is coupled to the gate electrode of FET 122. The multivibrator 128 is triggered by a signal applied to terminal 129.

Referring to the operation of the circuit shown in FIG. 1 set forth hereinabove, integrating amplifier 62 generates an output at predetermined sampling periods determined by the period of the signal generated by monostable multivibrator 84. The interposition of FET 122 between the output of integrating amplifier 62 and amplifier 66 provides an additional control level. The added storage capability provided by sample-and-hold capacitor 126 and amplifier 127 enables an operational sequence that samples a photoreceptor error signal at one point of the machine (or drum) cycle and then correspondingly corrects the output of corona electrode 78 at another specified point in the drum cycle. It should be noted at this point that the system response time is minimized when the electrometer probe is placed as close to the corona generator 80 as is feasible.

When a triggering pulse is applied to terminal 129 by the closing of a microswitch when the photoreceptor is detected at a predetermined point in the machine (for example, fixed point *e* shown in FIG. 1*a*), monostable multivibrator 128 is triggered and a negative pulse of a predetermined period (100 milliseconds, for example) is applied to the gate of FET 122. During the duration of the negative pulse, the previously sampled error signal appearing at the output of integrating amplifier 62 is transferred to capacitor 126 and then to amplifier 66. The high voltage corona generator 76, controlled by the output of amplifier 66, supplies a corresponding input voltage to corona electrode 78 whereby the surface of the photoreceptor is charged to the predetermined value.

Figure 4:
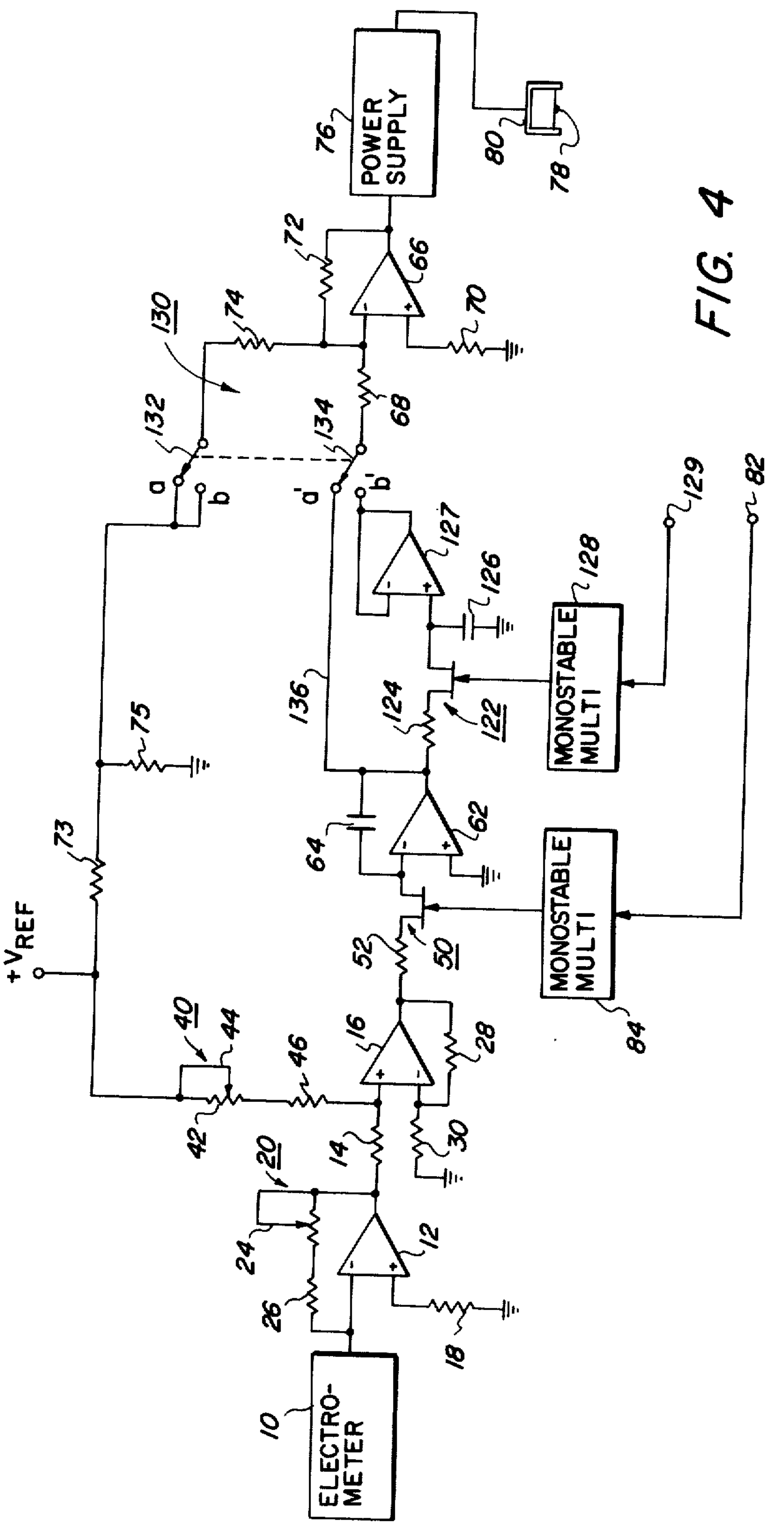
FIG. 4 is a schematic diagram of a multiple control system in accordance with the teachings of the present invention.

Referring now to FIG. 4, a multiple control system for allowing a machine operator to select either of the control circuits shown in FIGS. 1 and 3 is shown. Elements in FIGS. 3 and 4 having the same reference numerals are identical. FIG. 4 modifies the embodiment shown in FIG. 3 by the additiona of a double pole, double throw switch 130. In the position illustrated, contact 132 is at terminal *a* and contact 134 is at termina *a'*, and the sampled control circuit of FIG. 1 is incorporated into the system. In particular, the output of integrating amplifier 62 is coupled to amplifier 66 via lead 136, terminal *a'*, contact 134 and resistor 68. Similarly V*ref* is coupled to the input of amplifier 66 via the voltage divider comprising resistors 73 and 75, terminal *a*, contact 132 and resistor 74.

When the switch is positioned such that contact 132 is at terminal *b* and contact 134 is at position *b'*, the delayed sampled control circuit shown in FIG. 3 is incorporated into the system. In particular, the output from integrating amplifier 62 is transferred to the input of amplifier 66 via resistor 124, FET 122, storage capacitor 126, amplifier 127, terminal *b'*, contact 134 and resistor 68. Similarly, V*ref* is coupled to the input of amplifier 66 via the voltage divider comprising resistors 73 and 75, terminal *b*, contact 132 and resistor 74.

The advantage of the embodiment shown in FIG. 5 is that the operator of the machine incorporating a charge regulating circuit may, at his option, choose either one of two control circuits which may be appropriate for a particular situation.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Apparatus for maintaining the electrostatic potential on the surface of an insulator at a predetermined value, a point on said insulator surface passing a fixed reference point in a periodic manner comprising:

first means for generating a first signal indicative of the magnitude of the electrostatic potential on said insulator surface, second means for producing a reference signal which is proportional to said predetermined electrostatic potential, third means coupled to said first means and said second means for producing an error signal indicative of the difference between said first signal and said reference signal, integrator means connected to the output of said third means, switching means interposed between the output of said third means and said integrator means whereby the output of said third means is directly coupled to said integrator means for a predetermined time period when said switching means is enabled, means for applying a pulse of said predetermined time period to said switching means whereby said switching means is enabled, a high voltage supply coupled to the output of said integrator means and controlled thereby, and means for coupling the output of said high voltage supply to a corona electrode positioned adjacent said insulator surface, the charge on said insulator surface being controlled thereby during said predetermined time period thereby causing said insulator surface to be maintained at said predetermined electrostatic potential.

2. The apparatus as defined in claim 1 wherein said switching means comprises a field effect transistor having drain, source and gate electrodes, said switching means being enabled for said predetermined time period by applying said pulse of said predetermined time period to said gate electrode.

3. The apparatus as defined in claim 2 wherein said pulse is applied to said gate electrode each time a selected point on said insulator surface passes said fixed reference point.

4. The apparatus as defined in claim 3 wherein said insulator surface comprises a photoreceptor.

5. The apparatus as defined in claim 3 wherein said pulse is generated by a monostable multivibrator triggered each time said selected point on said insulator surface passes said fixed reference point.

6. Apparatus for maintaining the electrostatic potential on the surface of an insulator at a predetermined value, a point on said insulator surface passing first and second fixed reference points, in sequence, in a periodic manner comprising:

first means for generating a first signal indicative of the magnitude of the electrostatic potential on said insulator surface, second means for producing a reference signal which is proportional to said predetermined electrostatic potential, third means coupled to said first means and said second means for producing an error signal indicative of the difference between said first signal and said reference signal, integrator means connected to the output of said third means, first switching means interposed between the output of said third means and said integrator means whereby the output of said third means is directly coupled to said integrator means for a first predetermined time period when said first switching means is enabled, first means for applying a first pulse of said first predetermined time period to said first switching means whereby said first switching means is enabled, a high voltage supply coupled to the output of said integrator means and controlled thereby, second switching means interposed between the output of said integrator means and said high voltage supply whereby the output of said integrator means is directly transferred to said high voltage supply for a second predetermined time period when said second switching means is enabled, second means for applying a second pulse of said second predetermined time period to said second switching means whereby said second switching means is enabled, and means for coupling the output of said high voltage supply to a corona electrode positioned adjacent said insulator surface, the charge on said insulator surface being controlled thereby during said second predetermined time period thereby causing said insulator surface to be maintained at said predetermined electrostatic potential.

7. The apparatus as defined in claim 6 wherein said first and second switching means each comprise a field effect transistor having drain, source and gate electrodes, said first and second switching means being enabled for said first and second predetermined time periods, respectively, by applying said first and second pulses of said predetermined time periods to the gate electrode of said first switching means and to the gate electrode of said second switching means, respectively.

8. The apparatus as defined in claim 7 wherein said first pulse is applied to said first gate electrode each time said selected point on said insulator surface passes said first fixed reference point and said second pulse is applied to said second gate electrode each time said selected point on said insulator surface passes said second fixed reference point.

9. The apparatus as defined in claim 8 wherein said insulator surface comprises a photoreceptor.

10. The apparatus as defined in claim 6 further including third switching means operatively coupled to said integrator means and to said second switching means, said third switching means having first and second operative positions, the output of said integrator means being directly coupled to said high voltage supply when said third switching means is in said first operative position or through said enabled second switching means to said high voltage supply when said third switching means is in said second operative position.

11. Apparatus for maintaining the electrostatic potential on the surface of an insulator at a predetermined value, comprising:

first means for generating a first signal indicative of the magnitude of the electrostatic potential on said insulator surface, second means for producing a reference signal which is proportional to said predetermined electrostatic potential, third means coupled to said first means and said second means for producing an error signal indicative of the difference between said first signal and said reference signal, a digital incremental integrator connected to the output of said third means, logic means coupled to said digital incremental integrator whereby the output of said third means is operatively coupled to said digital incremental integrator for a first predetermined time period when said logic means is enabled, first means for applying a pulse of said first predetermined time period to said logic means whereby said logic means is enabled, a high voltage supply coupled to the output of said digital incremental integrator and controlled thereby, switching means interposed between the output of said digital incremental integrator and said high voltage supply whereby the output of said digital incremental integrator is directly transferred to said high voltage supply for a second predetermined time period when said switching means is enabled, second means for applying a pulse of said second predetermined time period to said switching means whereby said switching means is enabled, and means for coupling the output of said high voltage supply to a corona electrode positioned adjacent said insulator surface, the charge on said insulator surface being controlled thereby during said second predetermined time period thereby causing said insulator surface to be maintained at said predetermined electrostatic potential.

12. Apparatus for maintaining the electrostatic potential on the surface of an insulator at a predetermined value, a point on said insulator surface passing a fixed reference point in a periodic manner comprising:

first means for generating a first signal indicative of the magnitude of the electrostatic potential on said insulator surface, second means for producing a reference signal which is proportional to said predetermined electrostatic potential, third means coupled to said first means and said second means for producing an error signal indicative of the difference between said first signal and said reference signal, a digital incremental integrator connected to the output of said third means, logic means coupled to said digital incremental integrator whereby the output of said third means is operatively coupled to said digital incremental integrator for a predetermined time period when said logic means is enabled.

means for applying a pulse of said predetermined time period to said logic means whereby said logic means is enabled, a high voltage supply coupled to the output of said digital incremental integrator and controlled thereby, and means for coupling the output of said high voltage supply to a corona electrode positioned adjacent said insulator surface, the charge on said insulator surface being controlled thereby during said predetermined time period thereby causing said insulator surface to be maintained at said predetermined electrostatic potential.

* * * * *